(12) United States Patent
Fang et al.

(10) Patent No.: US 8,016,454 B2
(45) Date of Patent: Sep. 13, 2011

(54) LIGHT EMITTING DIODE ILLUMINATOR

(75) Inventors: Jui-Wen Fang, Miao-Li Hsien (TW);
Shu-Hui Hsieh, Miao-Li Hsien (TW);
Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 344 days.

(21) Appl. No.: 12/261,285

(22) Filed: Oct. 30, 2008

(65) Prior Publication Data

US 2009/0154170 A1 Jun. 18, 2009

(30) Foreign Application Priority Data

Dec. 18, 2007 (CN) .......................... 2007 1 0203157

(51) Int. Cl.
*F21V 17/00* (2006.01)
(52) U.S. Cl. ................... 362/249.02; 362/606; 362/634; 362/364; 349/58; 349/65
(58) Field of Classification Search ............ 362/249.02, 362/311.01, 311.14, 606, 614, 619, 632–634, 362/364; 349/58, 61, 62, 65
See application file for complete search history.

(56) References Cited

U.S. PATENT DOCUMENTS

| | | | | |
|---|---|---|---|---|
| 5,736,744 A * | 4/1998 | Johannsen et al. | ......... | 250/505.1 |
| 6,476,883 B1 * | 11/2002 | Salimes et al. | .................. | 349/58 |
| 6,691,443 B1 | 2/2004 | Slayden | | |
| 6,752,507 B2 * | 6/2004 | Wang et al. | ................... | 362/619 |
| 6,879,308 B2 * | 4/2005 | Hsieh et al. | ...................... | 345/87 |
| 6,949,772 B2 | 9/2005 | Shimizu et al. | | |
| 7,095,457 B2 * | 8/2006 | Chou | ............................. | 348/794 |
| 7,106,393 B2 * | 9/2006 | Lee | .................... | 349/58 |
| 7,134,780 B2 * | 11/2006 | Tsai | ............................... | 362/633 |
| 7,161,643 B2 * | 1/2007 | Hayano | .......................... | 349/58 |
| 7,241,041 B2 * | 7/2007 | Lo et al. | ........................ | 362/633 |
| 7,513,655 B2 * | 4/2009 | Chang | ........................... | 362/332 |
| 7,611,274 B2 * | 11/2009 | Hsiao et al. | .................. | 362/634 |
| 7,671,936 B2 * | 3/2010 | Chang | ............................. | 349/65 |
| 7,719,628 B2 * | 5/2010 | Suh et al. | ........................ | 349/58 |
| 2002/0113919 A1 | 8/2002 | Liu et al. | | |
| 2005/0078469 A1 * | 4/2005 | Jeong | ............................. | 362/31 |
| 2005/0122739 A1 * | 6/2005 | Huang et al. | .................. | 362/608 |

(Continued)

FOREIGN PATENT DOCUMENTS

CN 1464953 A 12/2003

(Continued)

*Primary Examiner* — James Lee
*Assistant Examiner* — Stanley Weinberg
(74) *Attorney, Agent, or Firm* — Altis Law Group, Inc.

(57) ABSTRACT

A light emitting diode illuminator includes at least one light source, a receiving seat and a power source arranged on the receiving seat for supplying currents to the at least one light source for causing the at least one light source emitting light. The receiving seat includes a panel and a back plate assembled to the panel. At least one receiving chamber is defined between the panel and the back plate. The receiving chamber defines an opening at a lateral side of the receiving seat. The at least one light source is mounted into the at least one receiving chamber via the opening of the receiving chamber. A block extends outwardly from the back plate to the opening of the receiving chamber to prevent the at least one light source from falling out from the at least one receiving chamber of the receiving seat.

15 Claims, 8 Drawing Sheets

| U.S. PATENT DOCUMENTS | | | | FOREIGN PATENT DOCUMENTS | | |
|---|---|---|---|---|---|---|
| 2005/0207165 A1 | 9/2005 | Shimizu et al. | | JP | 2000215715 A | 8/2000 |
| 2006/0007708 A1* | 1/2006 | Lee | 362/632 | TW | 391381 | 5/2000 |
| 2007/0091586 A1* | 4/2007 | Huang | 362/97 | TW | 474381 | 1/2002 |
| 2007/0127269 A1* | 6/2007 | Li et al. | 362/633 | WO | WO8908908 A | 9/1989 |
| 2007/0133193 A1* | 6/2007 | Kim | 362/147 | WO | WO2006085408 A | 8/2006 |
| 2007/0153549 A1* | 7/2007 | Parker | 362/619 | | | |
| 2007/0189039 A1* | 8/2007 | Yokota | 362/619 | * cited by examiner | | |
| 2007/0211496 A1* | 9/2007 | Ito | 362/633 | | | |

LIGHT EMITTING DIODE ILLUMINATOR

BACKGROUND

1. Field of the Disclosure

The disclosure generally relates to illuminators and, particularly, to an illuminator incorporating light emitting diodes as light source.

2. Description of Related Art

Light-emitting panels are commonly used in luminous signs for advertising purpose. Light emitting diodes (LEDs) are widely used as light sources of the light-emitting panels for its high luminance, low power consumption, long-term reliability and environmental friendliness. Generally a light-emitting panel includes a light-emitting window and an opposite rear wall. The rear wall defines a recess receiving the LEDs therein. After assembled, the rear wall is usually assembled to the window by means of screws or rivets. The LEDs thus are fixed between the rear wall and the window. Light of the LEDs travels through the window to outside. However, when it comes to maintenance, the rear wall and the window need to be disassembled for replacement of the LEDs, which is complicated and difficult process.

For the foregoing reasons, there is a need in the art for a new LED illuminator which overcomes the limitations described.

SUMMARY

According to an exemplary embodiment of the disclosure, a light emitting diode illuminator includes at least one light source and a receiving seat. The receiving seat includes a panel and a back plate assembled to the panel. At least one receiving chamber is defined between the panel and the back plate. One side of the receiving chamber at a lateral side of the receiving seat has an opening. The at least one light source is mounted into the at least one receiving chamber via the opening. A block extends outwardly from the back plate to the opening of the receiving chamber to prevent the at least one light source from falling out from the at least one receiving chamber of the receiving seat.

Other advantages and novel features of the disclosure will be drawn from the following detailed description of the exemplary embodiments of the disclosure with attached drawings.

DETAILED DESCRIPTION OF THE EMBODIMENTS

Figure 1:
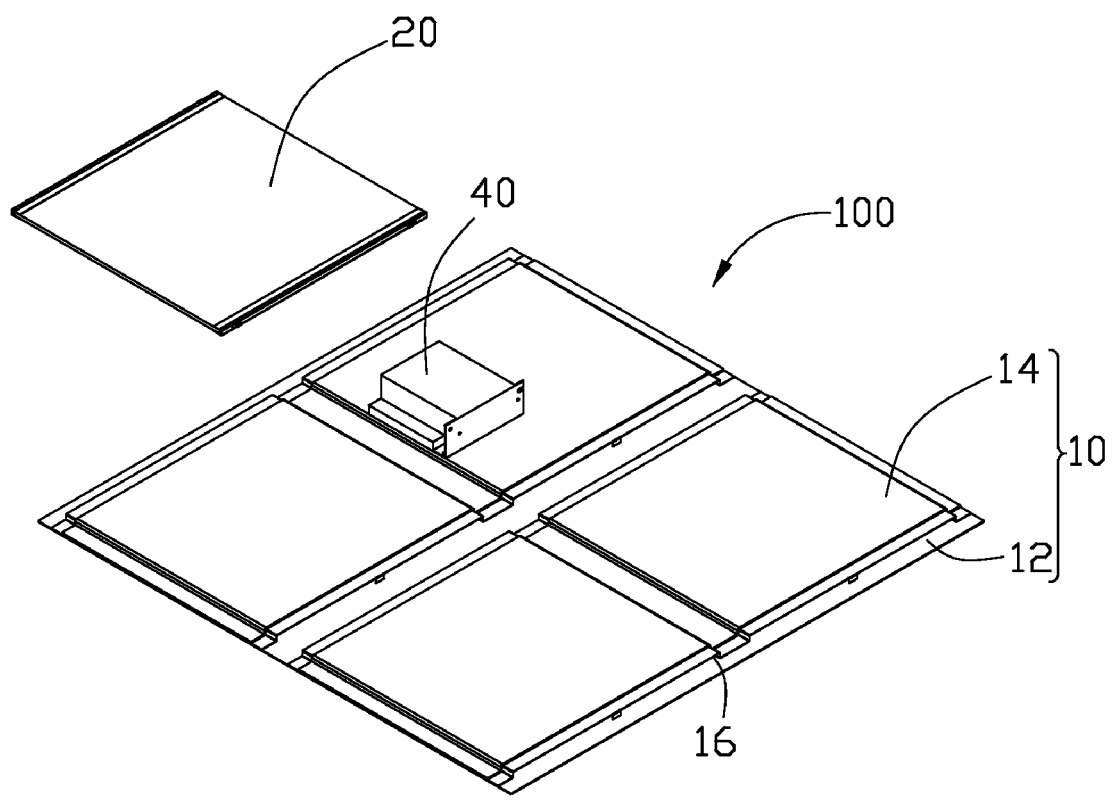
FIG. 1 is an exploded, isometric view of a light emitting diode illuminator according to an exemplary embodiment.
Figure 2:
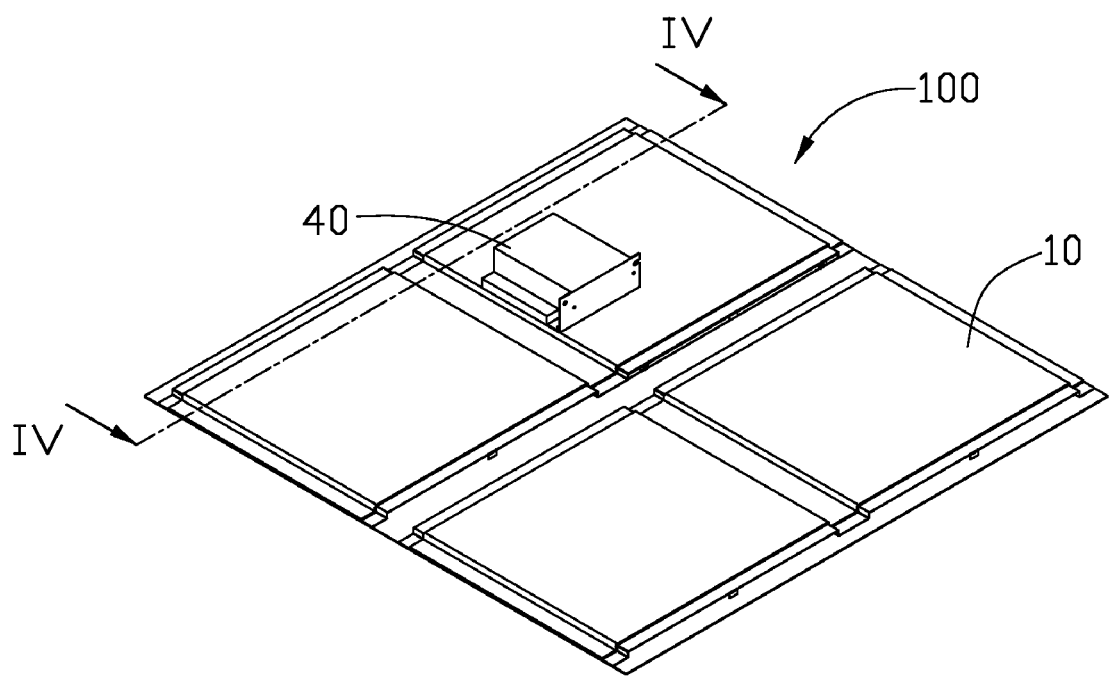
FIG. 2 is an assembled view of the light emitting diode illuminator of FIG. 1.

Referring to FIGS. 1 and 2, a light emitting diode (LED) illuminator 100 according to an exemplary embodiment includes a receiving seat 10, a plurality of light sources 20, and a power source 40 arranged on the receiving seat 10 for supplying currents to cause the light sources 20 to emit light.

Figure 6:
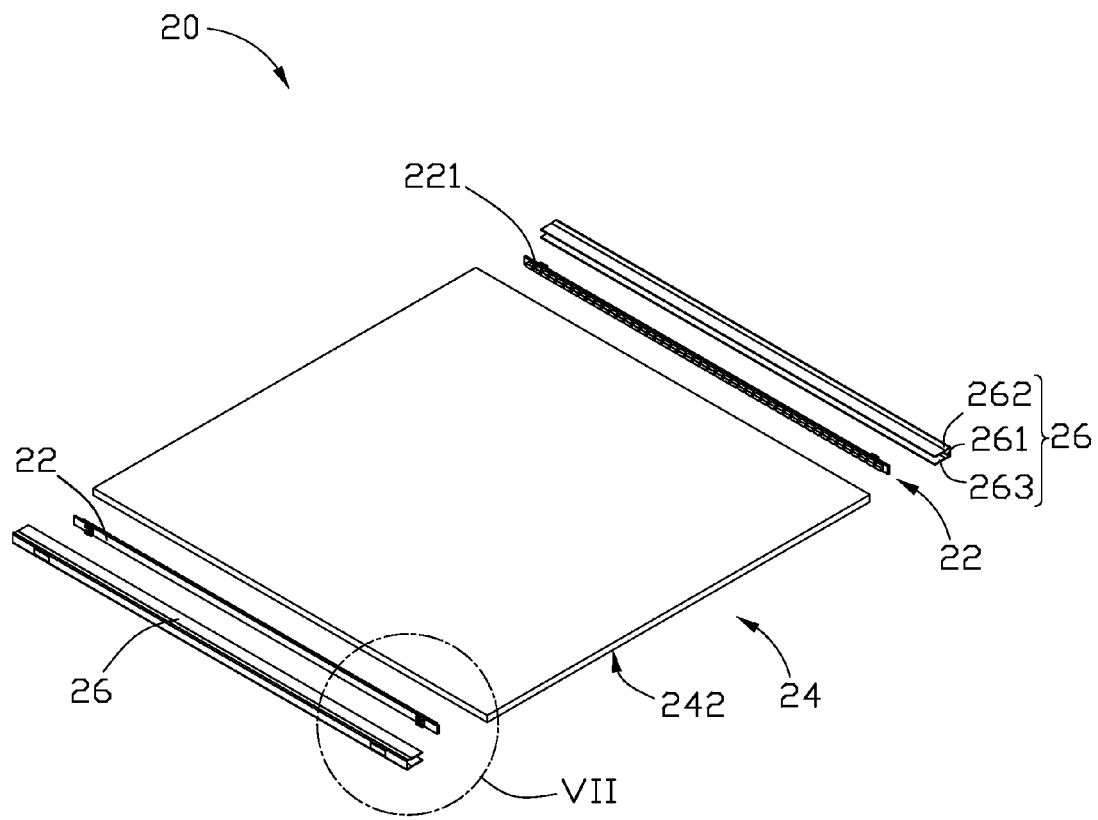
FIG. 6 is an exploded, isometric view of a light source of the light emitting diode illuminator of FIG. 1.
Figure 7:
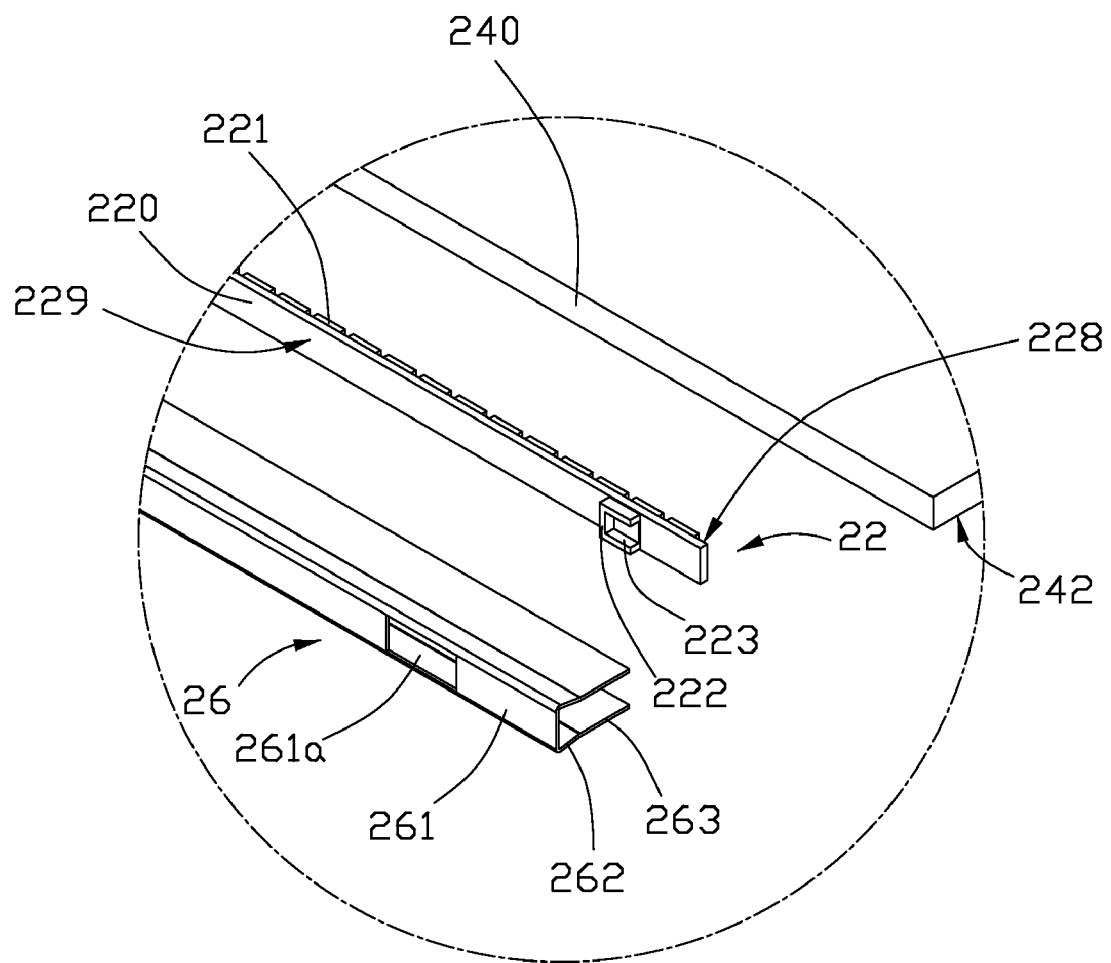
FIG. 7 is an enlarged view of the circled portion VII of FIG. 6.

There are four light sources 20 in this embodiment and each of the light sources 20 has the same structure as others, thus only one light source 20 is shown in the drawings in order to clearly show the receiving seat 10. Referring to FIGS. 6-7, each light source 20 includes a transparent plate 24, a pair of fasteners 26, and two LED arrays 22. The transparent plate 24 is made of polymethylmethacrylate (PMMA), polycarbonate (PC), polyacrylaet, glass, silicone, or epoxy. The transparent plate 24 includes an emitting surface 242 formed at a bottom side thereof, and a pair of incident surfaces 240 formed at front and rear sides of the transparent plate 24, respectively. The two incident surfaces 240 are elongated and rectangular. The emitting surface 242 is substantially square. The two incident surfaces 240 are located at two opposite sides of the emitting surface 242, and are perpendicular to the emitting surface 242.

The emitting surface 242 of the transparent plate 24 is rough for enhancing scattering effect of the transparent plate 24 to obtain relatively even light. A plurality of deformities or dots can be provided in the emitting surface 242. Alternatively, a plurality of granules are dispersed in the transparent plate 24 for enhancing scattering effect of the transparent plate 24. The granules can be crystalline particles or metal particles, such as $Al_2O_3$, $TiO_2$, $SiO_2$, $SiN_x$, $CaF_2$, $BaSO_4$, $ZnO$, $B_2O_3$, $Nb_2O_5$, $Na_2O$, $LiO_2$, which has a refractive index different from that of the transparent plate 24.

The two LED arrays 22 are respectively arranged at the front and rear sides of the transparent plate 24, and faces the incident surfaces 240, respectively. Each LED array 22 includes a mounting base 220 and a plurality of LEDs 221. The mounting base 220 is elongated, and includes an inner surface 228 facing the incident surface 240 of the transparent plate 24, and an opposite outer surface 229. A protrusion 222 extends outwardly from the outer surface 229 of the mounting base 220 adjacent to an end (a right end of FIG. 7) of the mounting base 220. The protrusion 222 is U-shaped, and has a hollow side 223 facing the right end of the mounting base 220. The LEDs 221 are linearly arranged on the inner surface 228 of the mounting base 220, and electrically connected together.

Each fastener 26 has a substantially U-shaped cross section, and includes a vertical plate 261, a pair of aslant plates 262, and a pair of parallel plates 263. A cutout 261a is defined in the vertical plate 261 corresponding to the protrusion 222 of the mounting base 220. The aslant plates 262 extend transversely from top and bottom sides of the vertical plate 261. The aslant plates 262 extend towards each other along the extending direction. Thus a distance between the aslant plates 262 decreases gradually from the vertical plate 261. The two parallel plates 263 extend from the two aslant plates 262, respectively. A distance between the two parallel plates 263 in the vertical direction is substantially equal to a thickness of the transparent plate 24.

During assembly of the light source 20, each mounting base 220 with the LEDs 221 mounted thereon is inserted into the corresponding fastener 26 and is located between the two aslant plates 262. The outer surface 229 of the mounting base 220 abuts the vertical plate 261 with the protrusion 222 extending through the cutout 261a. Thus a wire of the LEDs 221 can enter into the protrusion 222 of the mounting base 220 and then travels through the cutout 261a of the vertical plate 261 to electrically connect the LEDs 221 to the power source 40. The transparent plate 24 is fixed to the fasteners 26 with the front and rear sides of the transparent plate 24 sandwiched between the parallel plates 263 of the two fasteners 26, respectively. Thus when the LED arrays 22 at the front and rear sides of the transparent plate 24 emit light, the light enters into the transparent plate 24 and emit from the transparent plate 24 through the emitting surface 242 to light the ambient.

Figure 3:
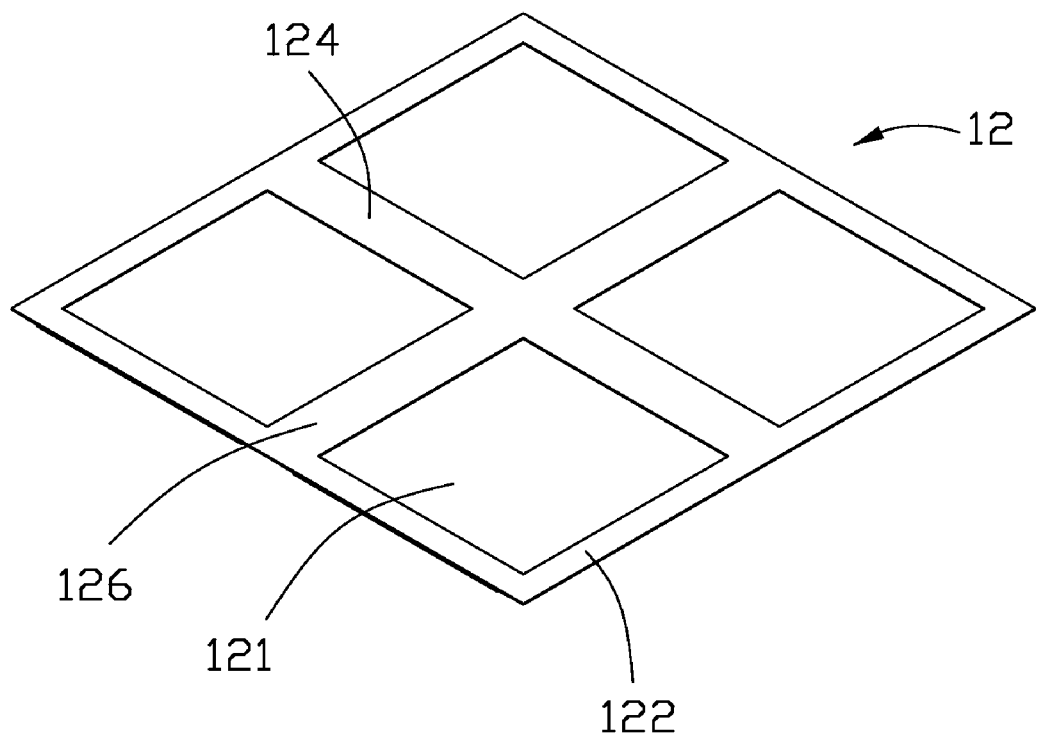
FIG. 3 shows the light emitting diode illuminator of FIG. 2 viewed form a bottom side thereof.

Referring to FIG. 3, the receiving seat 10 includes a panel 12, and a pair of back plates 14. The panel 12 is flat and rectangular, and defines four apertures 121 therein for the light of the light sources 20 traveling to the ambient. Each aperture 121 is rectangular, and has a size slightly smaller than the transparent plate 24 of the light source 20. The four apertures 121 are arranged in two rows and columns. The panel 12 thus has a hollow and rectangular frame 122, a first connecting portion 124 interconnecting middles of two opposite sides (i.e., left and right sides) of the frame 122, and a second connecting portion 126 interconnecting middles of the other two opposite sides (i.e., front and rear sides) of the frame 122. The first connecting portion 124 intersects the second connecting portion 126 at a center of the panel 12.

Figure 4:
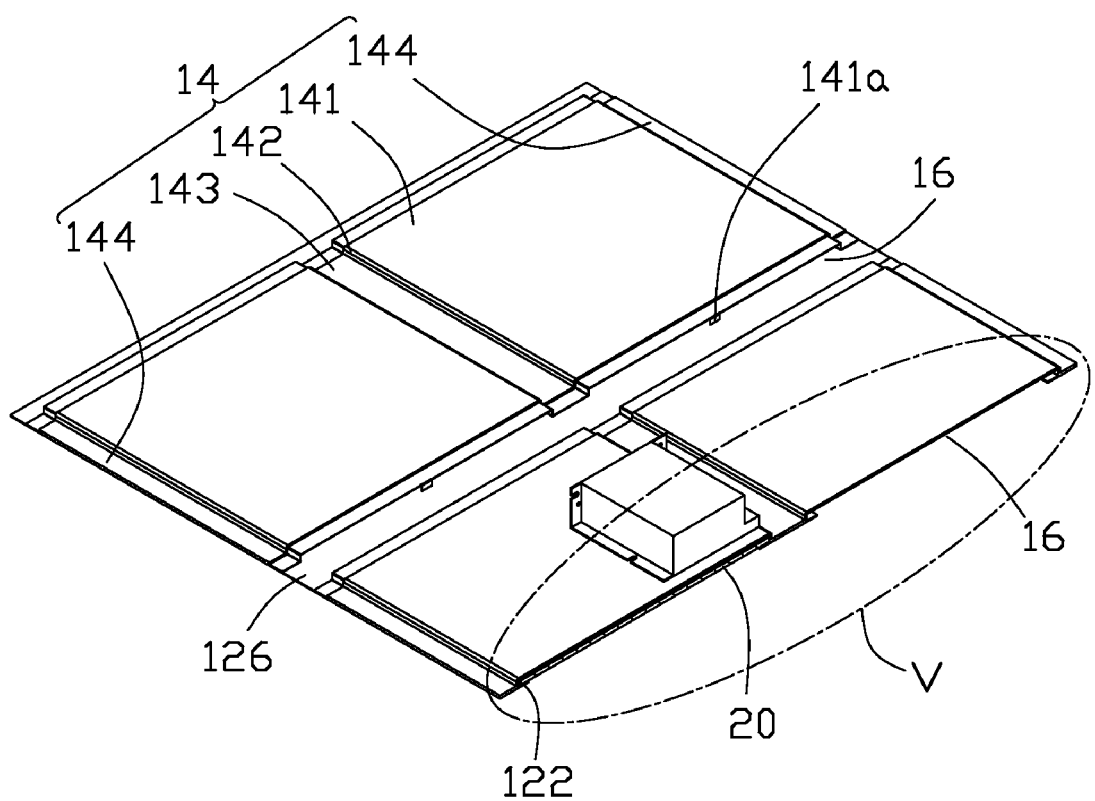
FIG. 4 is a cross sectional view of the light emitting diode illuminator taken along the line IV-IV of FIG. 2.
Figure 5:
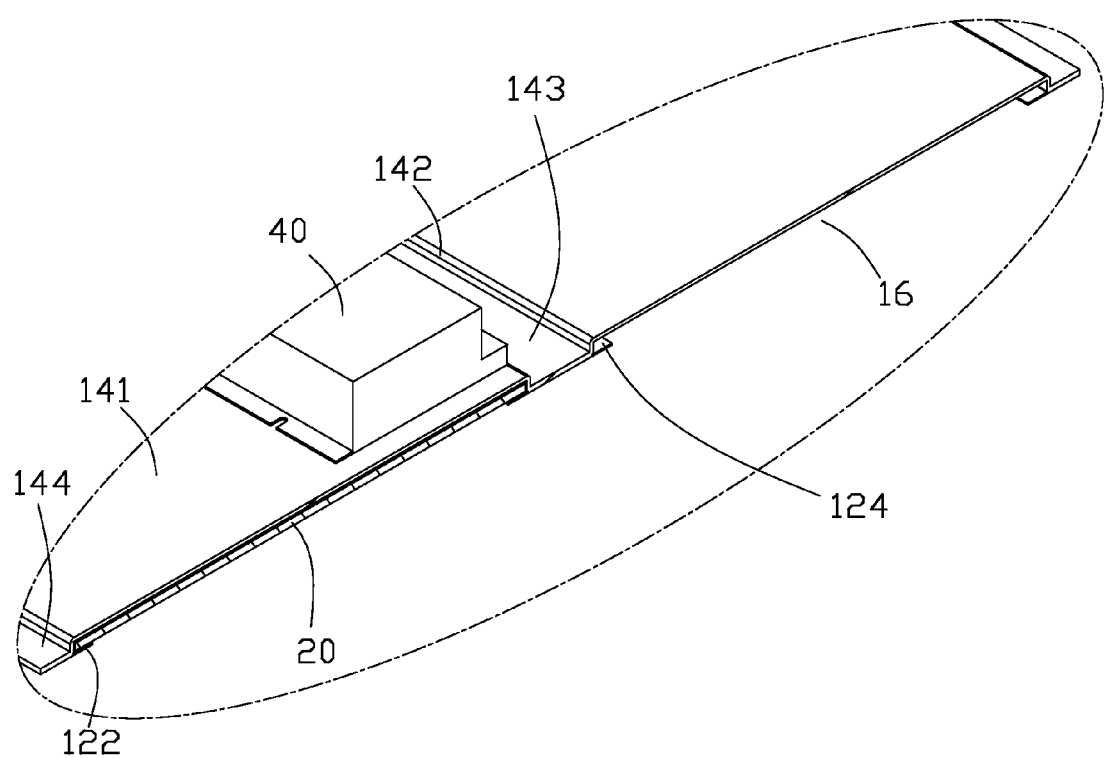
FIG. 5 is an enlarged view of the circled portion V of FIG. 4.

The two back plates 14 are mounted on the panel 12. Each back plate 14 corresponds to a pair of apertures 121. Referring back to FIGS. 1 and 2, one of the back plates 14 is located on the left side of the panel 12, and the other one of the back plates 14 is located on the right side of the panel 12. Referring to FIG. 4, each back plate 14 includes a pair of flat walls 141 spaced from each other. The flat wall 141 has a shape substantially the same as the aperture 121, and has a size slightly greater than that of the aperture 121. When the back plates 14 are assembled to the panel 12, each flat wall 141 hangs over one corresponding aperture 121 with four lateral sides thereof extending beyond four sides of the aperture 121, respectively. Thus a receiving chamber 16 is defined between each flat wall 141 of the back plate 14 and the panel 12. As shown in FIGS. 4-5, each receiving chamber 16 has a size substantially the same as that of the light source 20, and thus to receive one corresponding light source 20 therein.

A pair of flanges 142 extend perpendicularly and downwardly form front and rear sides of each flat wall 141 to the panel 12, thus to form a height difference between the panel 12 and the flat wall 141 to define the receiving chamber 16. A middle hem 143 is formed between bottoms of two adjacent flanges 142 of each back plate 14, and abuts against the first connecting portion 124 of the panel 12. An outer hem 144 extends transversely and outwardly from the bottom of each of the other two outmost flanges 142 of the back plate 14, and abuts against the frame 122 of the panel 12 at the front/rear side. Thus each of the back plates 14 can be assembled to the panel 12 via connection between the frame 122 of the panel 12 and the outer hems 144 of the back plate 14, and/or via the connecting potion 124, 126 of the panel 12 and the middle hem 143 of the back plate 14.

Figure 8:
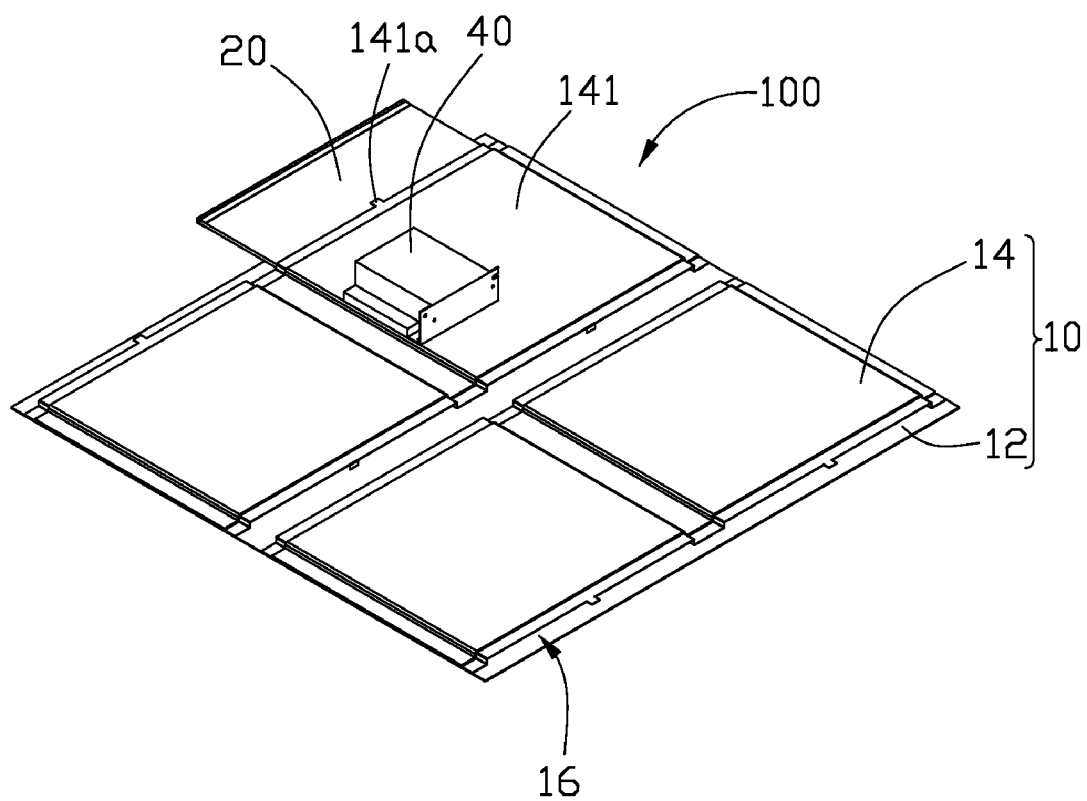
FIG. 8 shows assembly/disassembly of the light source of the light emitting diode illuminator of FIG. 1.

As the flanges 142 formed at front and rear sides of each flat wall 141, the front and rear sides of each receiving chamber 16 are sealed by the flanges 142. The left and right sides of the receiving chamber 16 remain open. Thus the light source 20 can be inserted into the receiving chamber 16 through the open side of the receiving chamber 16, i.e., the two left light sources 20 can be respectively inserted into the left receiving chambers 16 through the left open sides of the two left receiving chambers 16, and the two right light sources 20 can be respectively inserted into the right receiving chambers 16 through the right open sides of the two right receiving chambers 16. A pair of blocks 141a are formed at left and right sides of each flat wall 141. Referring to FIG. 8, the block 141a at lateral sides of the receiving chamber 16, i.e., the blocks 141a at the left side of the left back plate 14 and the blocks 141a at the right side of the right back plate 14, are coplanar with the flat walls 141 before the light sources 20 are inserted into the receiving chamber 16. After the light sources 20 are mounted into the receiving chamber 16, the blocks 141a are bent to be perpendicular to the flat walls 141 (as shown in FIG. 2). Thus the two blocks 141a abut respectively the left and right sides of the light source 20 to prevent the light source 20 from falling out from the receiving chamber 16 of the receiving seat 10 from the right/left open side.

Referring to FIG. 5 again, the front and rear sides of the light source 20 are sandwiched between the flat wall 141 of the back plate 14 and the first connecting portion 124, or the front/rear sides of the frame 122 of the panel 12. The left and right sides of the light source 20 are sandwiched between the flat wall 141 of the back plate 14 and the second connecting portion 126, or the left/right sides of the frame 122 of the panel 12. Therefore, movement of the light source 20 in the vertical direction is limited. The light source 20 is thus fixed into the receiving chamber 16. When the light source 20 of the illuminator 100 need to be replaced, the blocks 141a can be pulled upwardly to be horizontal, and thus the left/right side are open for removing the old light source 20 from the receiving chamber 16 and mounting the new light source 20 into the receiving chamber 16 of the receiving seat 10.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A light emitting diode illuminator, comprising:
   at least one light source; and
   a receiving seat comprising a panel and a back plate assembled to the panel, at least one receiving chamber, corresponding to the at least one light source, defined between the panel and the back plate, each of the at least one receiving chamber defining an opening at a lateral side of the receiving seat and an aperture, each of the at least one light source being mounted into one of the at least one receiving chamber via the opening of the receiving chamber and capable of emitting light via the aperture, a block extending outwardly from the back plate to the opening of each of the receiving chamber to prevent the one of the at least one light source from falling out from the one of the at least one receiving chamber of the receiving seat;
   wherein, to define each of the at least one receiving chamber, the back plate comprises a flat wall spaced from the panel, a pair of flanges extending from two opposite sides of the flat wall to the panel, and a hem extending transversely from each flange, the hem engaging with the panel to assemble the back plate to the panel, the receiving chamber being formed between the flat wall and the panel, the receiving chamber being open at the other two opposite sides of the flat wall without the flanges;
   wherein each of the at least one light source comprises a transparent plate, a light emitting diode array arranged at a side of the transparent plate, and a fastener fixing the light emitting diode array to the transparent plate;
   wherein the fastener includes a vertical plate, a pair of aslant plates extending transversely from top and bottom sides of the vertical plate, respectively, and a pair of parallel plates extending from the aslant plates, the transparent plate being sandwiched between the parallel plates, the light emitting diode array being received in the fastener and located between the aslant plates; and wherein the light emitting diode array comprises a mounting base, and a plurality of light emitting diodes arranged at an inner side of the mounting base and facing the transparent plate.

2. The light emitting diode illuminator of claim 1, further comprising a power source arranged on the receiving seat for supplying power to the at least one light source for causing the at least one light source emitting light.

3. The light emitting diode illuminator of claim 1, wherein the back plate comprises a plurality of flat walls, each flat wall and the panel forming one receiving chamber therebetween, the at least one light source comprising a plurality of light sources each being respectively received in one receiving chamber of a plurality of receiving chambers.

4. The light emitting diode illuminator of claim 3, wherein two adjacent flat walls of the back plate arranged in a line are connected together by the hems of the flanges.

5. The light emitting diode illuminator of claim 1, wherein the block can be bent to be coplanar with the flat wall of the back plate for inserting one of the at least one light source into or taking the at least one light source away from each the receiving chamber.

6. The light emitting diode illuminator of claim 1, wherein a cutout is defined in the vertical plate, and a protrusion extends from an outer surface of the mounting base through the cutout for wires interconnecting the light emitting diodes and the power source.

7. The light emitting diode illuminator of claim 1, wherein each of the at least one light source comprises a transparent plate forming an emitting surface at a bottom side thereof, a pair of incident surfaces at two opposite sides thereof and perpendicular to the emitting surface, a light emitting diode array confronting each of the incident surfaces, and a fastener fixing each light emitting diode array to the transparent plate.

8. A light emitting diode illuminator, comprising:
a plurality of light sources; and
a receiving seat defining a plurality of receiving chambers each receiving one of the plurality of light sources therein, each receiving chamber defining an opening at a lateral side of the receiving seat and an aperture, each of the plurality of light sources capable of emitting light via the aperture of a corresponding receiving chamber, a plurality of blocks each extending from the receiving seat to the opening of the corresponding receiving chamber to prevent a corresponding light source from falling out from the corresponding receiving chamber of the receiving seat, wherein each of the blocks can be bent to beyond the corresponding receiving chamber for inserting the corresponding light source into or taking the corresponding light source away from the corresponding receiving chamber via the opening of the corresponding receiving chamber;
wherein the receiving seat comprises a panel and a plurality of flat walls, each of the receiving chambers formed between one of the plurality of flat walls and the panel, a pair of flanges extending from each flat wall to the panel, a hem extending transversely from each flange and engaging with the panel to assemble each flat wall to the panel;
wherein each of the plurality of light sources comprises a transparent plate forming an emitting surface and at least one incident surface perpendicular to the emitting surface, and a light emitting diode array facing the at least one incident surface; and wherein the light emitting diode illuminator further comprises a fastener fixing the light emitting diode array to the transparent plate, the fastener comprising a vertical plate, a pair of aslant plates extending from top and bottom sides of the vertical plates towards each other, and a pair of parallel plates extending outwardly and horizontally from the slant plates, respectively, the transparent plate being sandwiched between the parallel plates, the light emitting diode array is arranged between the slant plates, and the vertical plate defining a cutout for extension of wires therethrough to connect the light emitting diode array electronically to a power source.

9. The light emitting diode illuminator of claim 8, wherein each of the other two sides of each flat wall without the flange has one block extending therefrom.

10. The light emitting diode illuminator of claim 8, wherein a plurality of deformities are provided in the emitting surface of the transparent plate.

11. The light emitting diode illuminator of claim 8, wherein a plurality of dots are provided in the emitting surface of the transparent plate.

12. The light emitting diode illuminator of claim 8, wherein a plurality of granules having a refractive index different from that of the transparent plate are dispersed in the transparent plate, the granules are one of the following materials: $Al_2O_3$, $TiO_2$, $SiO_2$, $SiN_x$, $CaF_2$, $BaSO_4$, $ZnO$, $B_2O_3$, $Nb_2O_5$, $Na_2O$, $LiO_2$.

13. The light emitting diode illuminator of claim 8, wherein the light emitting diode array comprising an elongated mounting base and a plurality of light emitting diodes linearly arranged on a first side of the mounting base, a U-shaped protrusion extending outwardly from a second side of the mounting base opposite to the first side through the cutout of the vertical plate of the fastener, a hollow side of the protrusion facing an end of the mounting base.

14. A light emitting diode illuminator, comprising:
a plurality of light sources, wherein each of the plurality of light sources comprises a transparent plate forming an emitting surface and at least one incident surface perpendicular to the emitting surface, and a light emitting diode array facing the at least one incident surface;
a receiving seat defining a plurality of receiving chambers each receiving one of the plurality of light sources therein, each receiving chamber defining an opening at a lateral side of the receiving seat and an aperture, each of the plurality of light sources capable of emitting light via the aperture of a corresponding receiving chamber, a plurality of blocks each extending from the receiving seat to the opening of the corresponding receiving chamber to prevent a corresponding light source from falling out from the corresponding receiving chamber of the receiving seat, wherein each of the blocks can be bent to beyond the corresponding receiving chamber for inserting the corresponding light source into or taking the corresponding light source away from the corresponding receiving chamber via the opening of the corresponding receiving chamber; and
a plurality of fasteners each fixing the light emitting diode array of one of the plurality of light sources to the transparent plate, each fastener comprising a vertical plate, a pair of aslant plates extending from top and bottom sides of the vertical plates towards each other, and a pair of parallel plates extending outwardly and horizontally from the slant plates, respectively, the transparent plate being sandwiched between the parallel plates, each light emitting diode array being arranged between the slant plates of the corresponding fastener, and the vertical plate of each fastener defining a cutout for extension of wires therethrough to connect the corresponding light emitting diode array electronically to a power source.

15. The light emitting diode illuminator of claim 14, wherein each light emitting diode array comprising an elongated mounting base and a plurality of light emitting diodes linearly arranged on a first side of the mounting base, a U-shaped protrusion extending outwardly from a second side of the mounting base of each light emitting diode array opposite to the first side through the cutout of the vertical plate of the corresponding fastener, a hollow side of the protrusion facing an end of the mounting base.

* * * * *